(12) United States Patent
Miyasaka

(10) Patent No.: US 9,900,565 B2
(45) Date of Patent: Feb. 20, 2018

(54) PROJECTOR CAPABLE OF ADJUSTING A LIGHT EXIT ANGLE

(71) Applicant: SEIKO EPSON CORPORATION, Tokyo (JP)

(72) Inventor: Koichi Miyasaka, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/122,296

(22) PCT Filed: Mar. 17, 2015

(86) PCT No.: PCT/JP2015/001483
§ 371 (c)(1),
(2) Date: Aug. 29, 2016

(87) PCT Pub. No.: WO2015/146072
PCT Pub. Date: Oct. 1, 2015

(65) Prior Publication Data
US 2016/0370695 A1   Dec. 22, 2016

(30) Foreign Application Priority Data
Mar. 26, 2014   (JP) ................. 2014-063248

(51) Int. Cl.
*H04N 9/31* (2006.01)
*G03B 21/14* (2006.01)
(Continued)

(52) U.S. Cl.
CPC ............ *H04N 9/317* (2013.01); *G03B 17/54* (2013.01); *G03B 21/14* (2013.01); *G03B 21/147* (2013.01);
(Continued)

(58) Field of Classification Search
CPC .. G02B 27/2214; G02B 27/225; H04N 9/317; H04N 9/3126; H04N 9/3194
See application file for complete search history.

(56) References Cited

U.S. PATENT DOCUMENTS 5,855,425 A * 1/1999 Hamagishi ......... G02B 27/2214
348/E13.029
6,710,920 B1 * 3/2004 Mashitani .......... G02B 27/2214
353/7
(Continued)

FOREIGN PATENT DOCUMENTS

JP    2003-140083 A     5/2003
JP    3576521 B2       10/2004
(Continued)

OTHER PUBLICATIONS

Oct. 17, 2017 Extended European Search Report issued in European Patent Application No. 15769552.9.

*Primary Examiner* — Bao-Luan Le
(74) *Attorney, Agent, or Firm* — Oliff PLC

(57) ABSTRACT

A projector includes a light exit adjustment mechanism that adjusts (sets) a light exit angle to be used for each of component light fluxes IL that exit from self-luminous devices disposed in a plurality of positions in a light emitter and a circuit apparatus that is a light controller that controls a light exit position and the light exit angle of each of the component light fluxes IL that exit out of the light exit adjustment mechanism in accordance with a projection area PD that is irradiated with the component light fluxes IL having passed through the light exit adjustment mechanism. Under the control of the circuit apparatus, the light exit adjustment mechanism allows the component light fluxes that form image light to exit from a plurality of positions at
(Continued)

angles different from each other to perform simultaneous or concurrent projection on the projection area.

11 Claims, 13 Drawing Sheets

(51) Int. Cl.
    *H04N 13/04*     (2006.01)
    *G03B 21/20*     (2006.01)
    *G03B 17/54*     (2006.01)
    *G03B 21/606*     (2014.01)
    *G03B 21/00*     (2006.01)

(52) U.S. Cl.
    CPC ..... *G03B 21/2013* (2013.01); *G03B 21/2046* (2013.01); *G03B 21/2053* (2013.01); *H04N 9/3194* (2013.01); *H04N 13/0418* (2013.01); *H04N 13/0459* (2013.01); *G03B 21/005* (2013.01); *G03B 21/606* (2013.01)

(56) References Cited

U.S. PATENT DOCUMENTS

| | | | |
|---|---|---|---|
| 7,420,737 B2* | 9/2008 | Williams | G02B 3/14 349/201 |
| 7,450,188 B2* | 11/2008 | Schwerdtner | G02B 27/225 348/E13.029 |
| 7,575,327 B2* | 8/2009 | Uchiyama | G09G 3/002 349/7 |
| 7,936,392 B2 | 5/2011 | Ng et al. | |
| 2002/0030887 A1* | 3/2002 | Hamagishi | G02B 27/2214 359/463 |
| 2005/0030308 A1 | 2/2005 | Takaki | |
| 2005/0237622 A1* | 10/2005 | Yoshino | G02B 27/2285 359/618 |
| 2007/0139777 A1* | 6/2007 | Williams | G02B 3/14 359/565 |
| 2007/0188667 A1* | 8/2007 | Schwerdtner | G02B 27/225 349/15 |
| 2008/0192155 A1* | 8/2008 | Uchiyama | G09G 3/002 349/8 |
| 2009/0174919 A1* | 7/2009 | Moss | G02B 27/225 359/23 |
| 2011/0190617 A1* | 8/2011 | Chen | A61B 5/0091 600/407 |
| 2014/0146290 A1 | 5/2014 | Sieler et al. | |

FOREIGN PATENT DOCUMENTS

| | | |
|---|---|---|
| JP | 2010-160343 A | 7/2010 |
| JP | 4752031 B2 | 8/2011 |
| KR | 10-2014-0015541 A | 2/2014 |
| WO | 2012/156280 A1 | 11/2012 |

\* cited by examiner

PROJECTOR CAPABLE OF ADJUSTING A LIGHT EXIT ANGLE

The entire disclosure of Japanese Patent Application No. 2014-063248, filed Mar. 26, 2014 is expressly incorporated by reference herein.

TECHNICAL FIELD

The present invention relates to a projector capable of simultaneous or concurrent projection in different positions in the depth direction.

BACKGROUND ART

In a projector of related art, since a projection optical system that enlarges and projects an image formed on a planar display device is used, a plane where focus is achieved is a substantially flat plane, and allowed adjustment is only shifting the plane forward or rearward. That is, change in focus position and simultaneous or concurrent projection in projection receiving areas at different depth positions are not allowed, and there has been no projector capable, for example, of performing projection on a curved screen with focus maintained over the surface or coping with a change in the shape of the curved screen.

Meanwhile, there is a technology that is not related to a projector but allows an imaging apparatus to acquire information on the direction of light incident on a two-dimensional sensor and simultaneously capture images of subjects at different distances in the depth direction (see PTL 1).

CITATION LIST

Patent Literature

PTL 1: U.S. Pat. No. 7,936,392

SUMMARY OF INVENTION

Technical Problem

The invention has been made in view of the circumstance described above, and an object of the invention is to provide a projector capable of projection in a projection receiving area having a depth.

Solution to Problem

In order to solve the problems described above, a projector according to the invention includes a light exit adjustment mechanism capable of adjusting a light exit angle to be used for each of component light fluxes that exit from a plurality of positions in a light emitter and a light controller that controls a light exit position and the light exit angle of each of the component light fluxes that exit out of the light exit adjustment mechanism in accordance with a projection area that is located in an irradiation receiving area irradiated with the component light fluxes having passed through the light exit adjustment mechanism and contains different positions in a depth direction.

In the projector described above, under the control of the light controller, the component light fluxes that form image light that exits out of the light exit adjustment mechanism are adjusted in terms of the light exit position and the light exit angle. The focus position can thus be so changed that image projection can be performed, for example, on a projection area having a depth, that is, a projection area having areas at different distances in the depth direction.

In a specific aspect of the invention, the projector further includes a projection optical system that projects the component light fluxes having passed through the light exit adjustment mechanism on the projection area.

In another aspect of the invention, the light exit adjustment mechanism includes a light selector that limits light transmission for each of the component light fluxes emitted from the light emitter to select a component having the light exit angle to be used. In this case, the light exit angle of each of the component light fluxes can be adjusted by the light selector.

In still another aspect of the invention, the light selector is a panel-type member that switches light blockage to light transmission and vice versa, and the light controller controls the switching performed by the panel-type member between the light blockage and the light transmission to cause the panel-type member that receives the component light fluxes emitted from the light emitter to select a component having a predetermined light exit angle. In this case, the light blockage and the light transmission are so switched from one to the other that the light transmission is limited, whereby the number of selection patterns in accordance of which the light exit angle of each of the component light fluxes is selected can be increased.

In still another aspect of the invention, in the light exit adjustment mechanism, the light emitter includes a planar light emission source, and the two-dimensional or three-dimensional projection area is irradiated together with the component light fluxes emitted from the light emission source. In this case, the planar light emitter allows image projection on the projection area in a planarly or spatially simultaneous manner with no light scanning or any other operation.

In still another aspect of the invention, the light emitter includes a plurality of self-luminous devices that emit the component light fluxes from a plurality of planarly arranged light emission points. In this case, the plurality of self-luminous devices can form an image.

In still another aspect of the invention, each of the self-luminous devices produces coherent light. In this case, the light exit angle of each of the component light fluxes can be readily and accurately adjusted, whereby light can be used with high efficiency.

In still another aspect of the invention, the light exit adjustment mechanism includes a plurality of lens portions that are provided in correspondence with the plurality of light emission points in the light emitter and each adjust the light exit angle of the light flux emitted from the corresponding light emission point. In this case, the plurality of lens portions allow the adjustment of the light exit angle of each of the component light fluxes.

In still another aspect of the invention, the light emitter includes an illumination optical system that forms illumination light from light source light produced by a light source section and a light modulator that modulates the illumination light from the illumination optical system. In this case, the light modulator can output the illumination light from the illumination optical system as the component light fluxes from the plurality of positions that form the image light.

In still another aspect of the invention, the light exit adjustment mechanism includes a panel-type member that switches light blockage to light transmission and vice versa as the light selector that receives the component light fluxes emitted from the light emitter and selects a component having a light exit angle, and the panel-type member may be so configured that a plurality of pixels thereof correspond to each of pixels that form the light modulator. In this case, a plurality of pixels on the panel-type member side that correspond to each of the pixels that form the light modulator can be switched to another plurality of pixels to select the light blockage or the light transmission in such a way that from the component light flux having exited from the pixel on the light modulator side, a component having a desired light exit angle can be selected when the component light flux has an angular distribution.

In still another aspect of the invention, the light exit adjustment mechanism causes the light emitter to form color component light fluxes in correspondence with color light fluxes and may adjust an angular component to be used for each of the color component light fluxes, and the projector further includes a light combining optical system that combines the color component light fluxes having passed through the light exit adjustment mechanism. In this case, a color image can be projected.

DESCRIPTION OF EMBODIMENTS

[First Embodiment]

Figure 1:
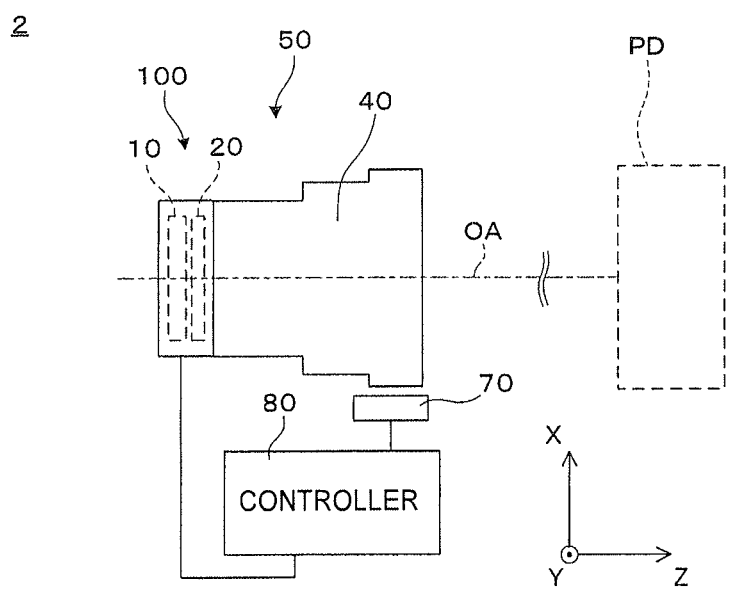
FIG. 1 describes a projector according to a first embodiment.
Figure 2:
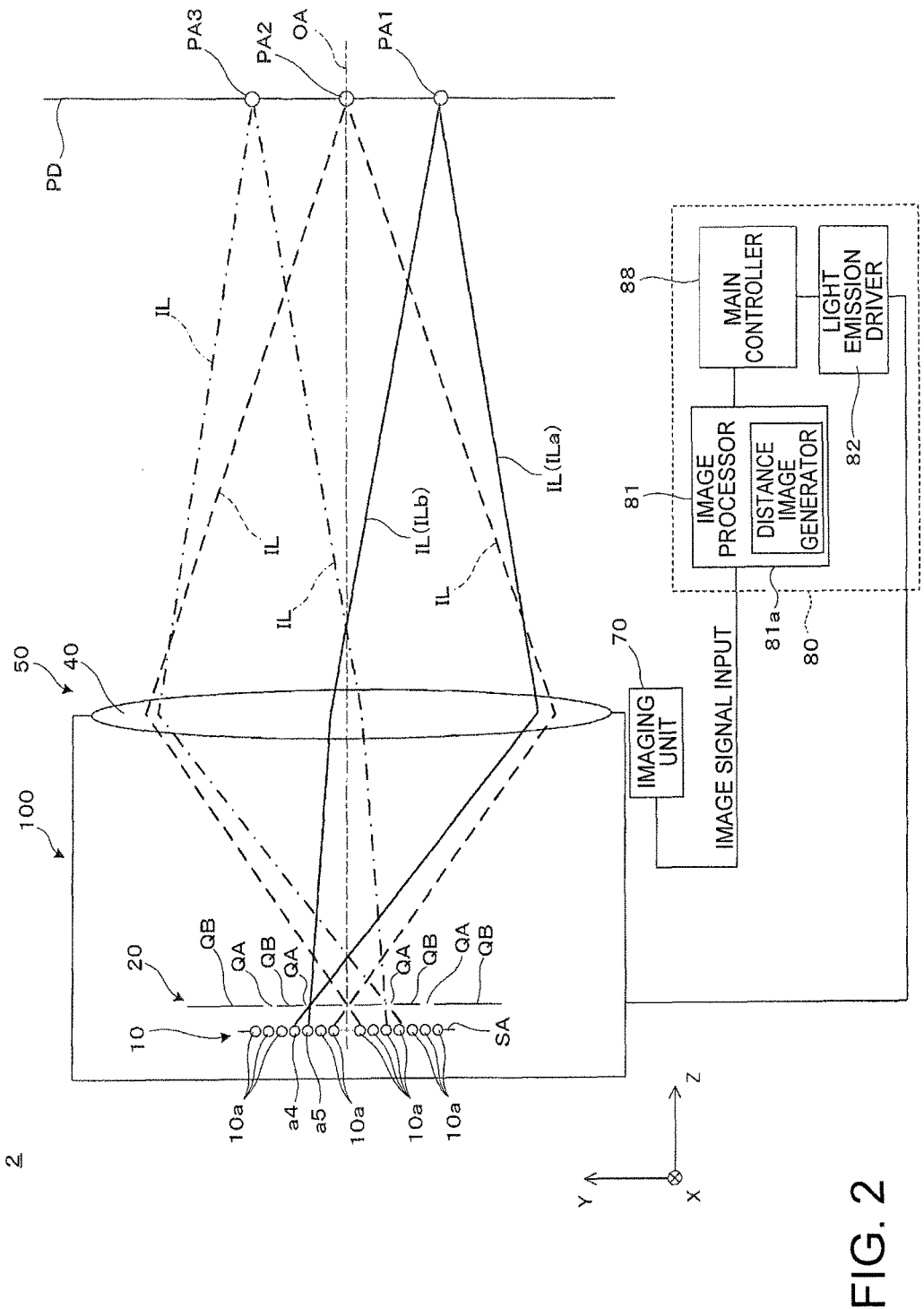
FIG. 2 is a view for describing the structure of the projector.

A projector 2 of a first embodiment according to the invention includes an optical system unit 50, which projects image light, an imaging unit 70, which captures an image of a projection area PD in an irradiation receiving area where the optical system unit 50 can project the image light to acquire information on the distance to the projection area PD, and a circuit apparatus 80, which controls the operation of the optical system unit 50, as shown in FIGS. 1 and 2.

The optical system unit 50 includes a light exit adjustment mechanism 100 and a projection optical system 40. The light exit adjustment mechanism 100 includes a light emitter 10 and a light selector 20.

In the optical system unit 50, the light emitter 10 in the light exit adjustment mechanism 100 has a large number of self-luminous devices 10a arranged in a matrix in a light exit plane SA parallel to an XY plane perpendicular to an optical axis OA, as shown in FIG. 2. The plurality of planarly arranged self-luminous devices 10a serve as a plurality of light emission points from which component light fluxes IL, which will form image light, exit. The light emitter 10 thus serves as a light emission source that produces planarly spreading light.

In the light exit adjustment mechanism 100, the light selector 20 is a member that allows selection of passage or rejection of the component light fluxes IL emitted from the self-luminous devices 10a arranged in a plurality of positions in the light emitter 10. That is, the light selector 20 is a member that determines blockage or transmission of the component light fluxes IL. From a different point of view, it can be said that the light selector 20 limits transmission of the component light fluxes IL emitted from the self-luminous devices 10a.

Here, the large number of self-luminous devices 10a, which form the light emitter 10, are capable of emitting the component light fluxes IL in different directions or at different angles, as shown in FIG. 2. Component light fluxes IL thus emitted from self-luminous devices 10a located in different positions can be superimposed on one another at a single point (position) in the projection area PD. Superimposition of component light fluxes IL allows projection of an image that is bright enough even when each of the component light fluxes IL carries a small amount of light. The amount of light can further be improved by increasing the number of light fluxes collected at a single point. It is, however, noted that since collecting a large number of components at a single point for an increase in the amount of light reduces the number of pixels of an image formed on the projection area PD, a desired number of components to be collected is in practice set in accordance with the balance between a required amount of light and required resolution.

Figure 3A:
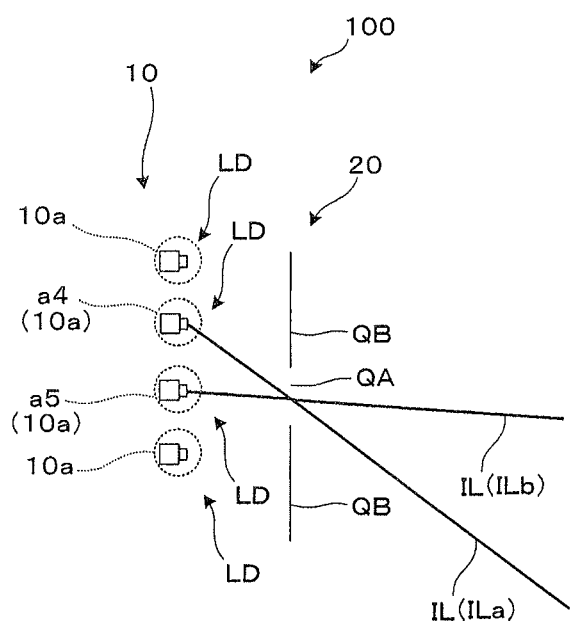
FIG. 3(A) is a view showing an example of the structure of a light emitter.
Figure 3B:
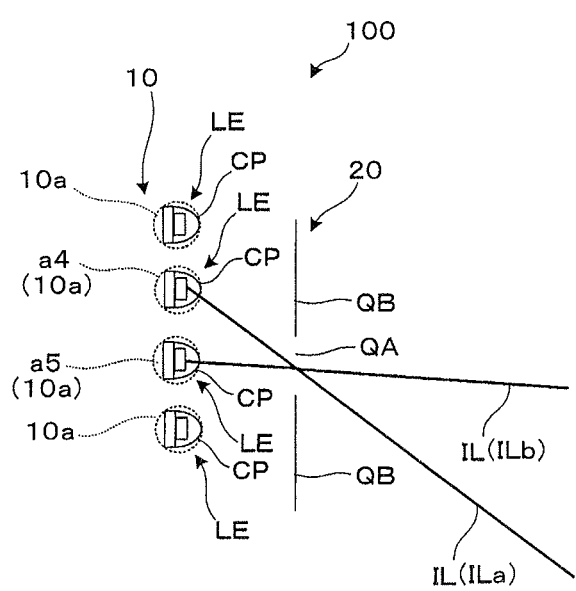
FIG. 3(B) is an view showing another example of the structure of the light emitter.

FIGS. 3(A) and 3(B) show examples of the configuration of the large number of self-luminous devices 10a that emit the component light fluxes IL in different directions or at different angles as described above. In the example shown in FIG. 3(A), each of the self-luminous devices 10a is formed of a laser-type light emitting device. In this case, each of the self-luminous devices 10a is formed of a laser-type light emitting device LD that emits a component light flux IL in the form of laser light, and a mirror (not shown) provided at the tip of the laser-type light emitting device LD and inclined as appropriate allows the laser light or the component light flux IL to be emitted at a desired angle or in a desired direction. Configuring each of the self-luminous devices 10a to produce laser light, that is, coherent light as described above allows the light exit angle of the component light flux IL to be readily and accurately adjusted, whereby the light can be used with high efficiency.

In the example shown in FIG. 3(B), each of the self-luminous devices 10a is formed of an LED light source. In this case, each of the self-luminous devices 10a is formed of an LED package in which an LED-type light emitting device LE that emits a component light flux IL in the form of LED light is covered with and protected by a cap member (lens member) CP having a lens function, and the cap member CP can refract the component light flux IL in such a way that the light exit angle or direction of the component light flux IL is adjusted as appropriate.

The large number of self-luminous devices 10a can thus emit the component light fluxes IL in directions different from each other. The self-luminous devices 10a shown FIGS. 3(A) and 3(B) are presented by way of example, and each of the self-luminous devices 10a can be structured differently. For example, each of the LEDs in FIG. 3(B) described above can be replaced, for example, with a high-pressure mercury lamp as an illumination optical system. In a case where each of the component light fluxes IL is emitted over a range of exit angle, that is, the emitted component light flux IL diverges, light transmitters QA and light blockers QB of the light selector 20, which will be described later in detail, can be adjusted in terms of widths (sizes and ranges) and positions thereof. The light exit angles of the component light fluxes to be used can thus be so restricted that they are in a desired state.

Referring back to FIG. 2, the light selector 20 will be described in detail. The light selector 20 has a configuration in which a large number of slit-shaped or grid-shaped light transmitters QA and light blockers QB are provided and alternately arranged in correspondence with the self-luminous devices 10a in the light emitter 10, which emit the component light fluxes IL as described above. That is, in the light selector 20, the light transmitters QA transmit component light fluxes IL to be used, whereas the light blockers QB block the other components to limit the light transmission. More specifically, the light transmitters QA and the light blockers QB can, for example, be configured in the form of a grid-shaped member in which portions with holes and portions with no holes (portions with blocked holes) are formed so that the positions of the light transmitters QA and the light blockers QB are fixed. For example, a parallax barrier or any other similar configuration is conceivable. The light selector 20 can still instead be formed, for example, of a panel-type member having a valve function of switching the light blockage to the light transmission and vice versa so that the positions of the light transmitters QA and the light blockers QB can be changed. The switching control of variably changing the light blockage to the light transmission and vice versa allows an increase in the number of selection patterns in accordance with which the light exit angle of each of the component light fluxes is selected. Further, the widths (sizes and ranges) of the light transmitters QA and the light blockers QB can be configured in a variety of manners, and can, for example, be configured in accordance with the size and arrangement of the self-luminous devices 10a, or the light transmitters QA and the light blockers QB can instead be arranged at intervals smaller (narrower) than the intervals at which the self-luminous devices 10a are arranged. As described above, the light selector 20, which has the light transmitters QA and the light blockers QB, can transmit a component having alight exit angle to be used but reject the other components among the component light fluxes IL. Further, the light emitter 20 can limit the angular divergence of each of the component light fluxes IL to provide the component light flux IL with directivity. For example, the light selector 20 conceivably has the configuration of a lenticular lens. In other words, the light selector 20 is a member that determines whether or not each of the component light fluxes IL is used as image light based on the light exit angle thereof.

As described above, the light exit adjustment mechanism 100, specifically, the light emitter 10 and the light selector 20 allow adjustment of the light emission position of each of the component light fluxes IL, which form the image light, and the light exit angle to be used for each of the component light fluxes IL. That is, the light exit adjustment mechanism 100 is a light setting unit that sets the image light exit state on the light source side under the control of the circuit apparatus 80. When the light selector 20 has a variably controllable configuration, the relationship between the light emission positions in the light emitter 10 and the positions of the light selector 20 light transmitters QA can be adjusted under the control of the circuit apparatus 80 for an increase in light usage efficiency, whereby the amount of light can be further increased.

The projection optical system 40 is a projection lens that projects the image light in the form of the component light fluxes IL having passed through the light exit adjustment mechanism 100 as described above, that is, the entire component light fluxes IL having passed through the light selector 20 on the projection area PD. Among the component light fluxes IL having passed through the projection optical system 40, a component light flux IL is superimposed on another component light flux IL on the projection area PD, as shown in FIG. 2. For example, among the self-luminous devices 10a, a self-luminous device a4 (10a), which is the fourth counted from above in FIG. 2, and a self-luminous device a5 (10a) adjacent thereto, which is the fifth counted from above in FIG. 2, emit component light fluxes IL at angles different from each other, and these component light fluxes IL eventually reach the same position PA1 on the projection area PD, as indicated by the solid lines in FIG. 2. That is, a component light flux ILa (IL) from the self-luminous device a4 and a component light flux ILb (IL) from the self-luminous device a5 are superimposed on each other in the position PA1 on the projection area PD to form a single projected pixel as a projected image. Similarly, component light fluxes IL indicated by the broken lines in FIG. 2 are superimposed on each other in a position PA2 on the projection area PD to forma single projected pixel, and component light fluxes IL indicated by the dashed lines in FIG. 2 form a single projected pixel in a position PA3. As described above, since the component light fluxes IL from the large number of self-luminous devices 10a planarly arranged in the light emitter 10 are together emitted toward the projection area PD, an image can be formed on a surface area of the projection area PD. For example, when each of the component light fluxes IL angularly diverges, the projection optical system 40 also functions to cause the divergent light fluxes to converge while projecting the light fluxes on the projection area PD.

The imaging unit 70 is formed of a camera capable of measuring, for example, a distance image. Specifically, the imaging unit 70 captures an image of the projection area PD in the irradiation receiving area, where the optical system unit 50 described above projects the image light, and measures, for example, the distance from the projector 2 to the projection area PD, the shape of the projection area PD, that is, the distances to each small area of the projection area PD and even each point thereon. That is, the projector 2, which includes the imaging unit 70, can acquire information on the depth of the projection area PD with respect to the projector 2 (information on Z direction) and information on the orientation toward each small area (each point) of the projection area PD. In FIG. 2, the projection area PD is a flat surface perpendicular to the optical axis OA. In this case, it is enough to acquire information on the distance to the projection area PD along the optical axis OA (depth information).

The circuit apparatus 80 includes an image processor 81, a light emission driver 82, and a main controller 88 and controls the overall operation of the projector 2 including control of operation of the optical system unit 50. The main controller 88 oversees the overall operation. The image processor 81 processes image information to be projected, and at the same time, particularly in the present embodiment, the image processor 81 acquires the distance information, such as the shape of the projection area PD, acquired from the imaging unit 70, and performs the image processing based on the distance information. The light emission driver 82 controls the operation of the light emitter 10 and the light selector 20, which form the light exit adjustment mechanism 100, in accordance with instructions from the main controller 88 and the image processor 81. That is, the light emission driver 82 not only controls the timing at which the self-luminous devices 10a, which form the light emitter 10, are turned on and the amount of light from the self-luminous devices 10a after they are turned on but also switches the arrangement of the large number of slit-shaped light transmitters QA and light blockers QB in the light selector 20 to another arrangement. As described above, the circuit apparatus 80, when it controls the operation of the light exit adjustment mechanism 100 among a variety of types of control of the operation of the projector 2, functions as a light controller that controls the light exit position and the light exit angle of each of the component light fluxes IL.

Figure 4A:
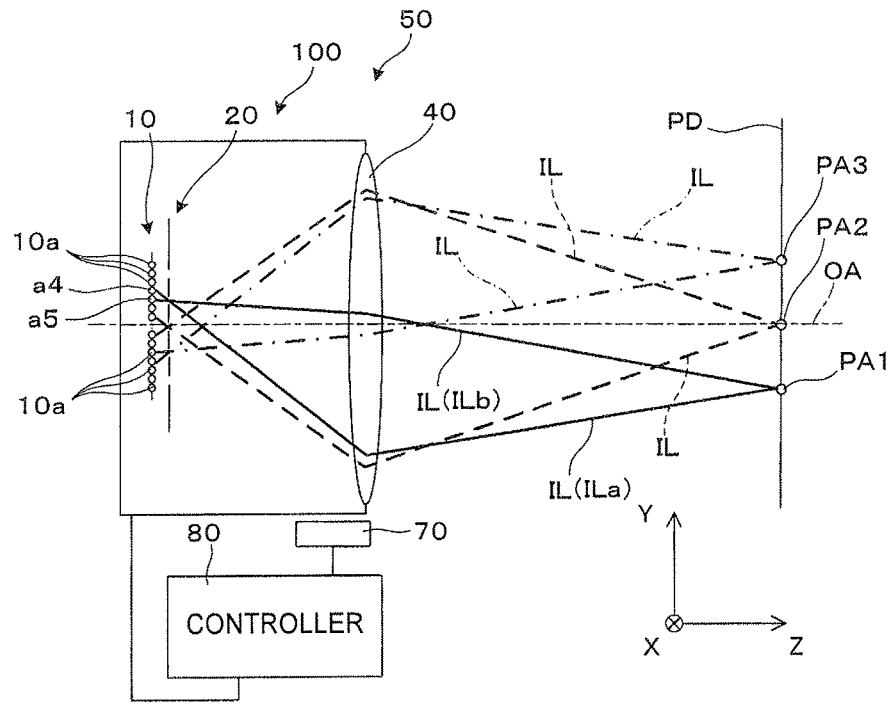
FIG. 4(A) is a view showing an example of projection performed by the projector.
Figure 4B:
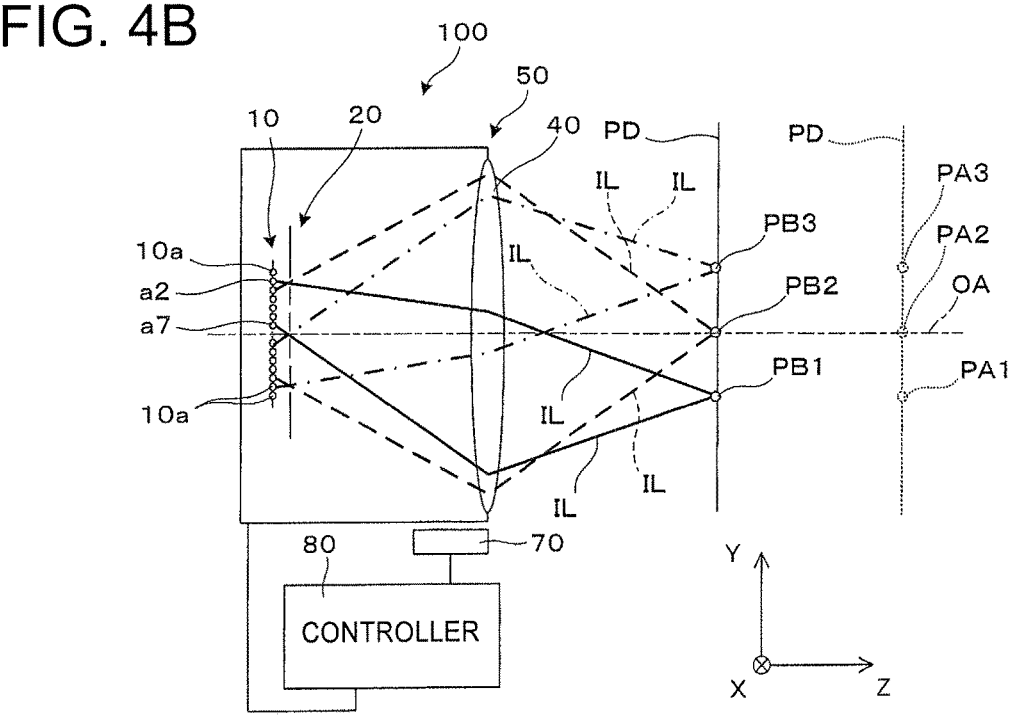
FIG. 4(B) is a view showing another example of the projection performed by the projector.

When the thus configured projector 2 projects an image, the circuit apparatus 80 can control the light exit adjustment mechanism 100 having the function of selecting desired ones of the component light fluxes IL in such a way that the position where the image is formed is changed as appropriate. A focused image can therefore be formed in projection areas PD at different distances without using a focusing function of the projection optical system 40, as shown, for example, in FIG. 4(A) and in FIG. 4(B). In other words, the focus position can be changed in accordance with the shape and other factors of the projection area PD. Among FIGS. 4(A) and 4(B), FIG. 4(A) shows a case where the projection area PD is a flat surface perpendicular to the optical axis OA and located in a position relatively remote from the projector 2 in the depth direction (Z direction); and FIG. 4(B) shows a case where the projection area PD is a flat surface perpendicular to the optical axis OA and located in a position relatively close to the projector 2 in the depth direction (Z direction). Here, it is assumed that when projection is performed on a single flat surface, for example, when only the projection shown in FIG. 4(A) or only the projection shown in FIG. 4(B) is performed, the projection is performed at a fixed distance in the depth direction. It is further assumed that when both the projection shown in FIG. 4(A) and the projection shown in FIG. 4(B) are performed or when projection is performed on projection areas in two or more different positions, as will be described later with reference to FIG. 5 and other figures, the projection is performed in different positions in the depth direction.

A description will be made of an example of image projection performed by the projector 2 in each of the cases shown in FIGS. 4(A) and 4(B). First, as a prerequisite common to FIGS. 4(A) and 4(B), the circuit apparatus 80 controls the light exit adjustment mechanism 100 in such a way that the light exit adjustment mechanism 100 acquires information on the distance to the projection area PD from the imaging unit 70 and outputs light rays according to image information corrected based on the distance information. Specifically, for example, in the projection shown in FIG. 4(A), among projection positions on the projection area PD, for example, a position PA1 located in a lower portion of the projection area PD receives component light fluxes IL indicated by the solid lines as light rays corresponding to the position. That is, the circuit apparatus 80 controls the light exit adjustment mechanism 100 in such a way that the self-luminous device a4 and the self-luminous device a5 among the self-luminous devices 10a, which form the light emitter 10, are involved in formation of an image (pixel) in the position PA1. Similarly, the circuit apparatus 80 controls the light exit adjustment mechanism 100 in such a way that among the projection positions on the projection area PD, a position PA2 located in a central portion thereof receives component light fluxes IL from other self-luminous devices 10a (broken lines in FIG. 4(A)), and that among the projection positions on the projection area PD, a position PA3 located in a upper portion thereof receives component light fluxes IL from still other self-luminous devices 10a (dashed lines in FIG. 4(A)). The above description has been made of the image projection in the three positions PA1 to PA3 for ease of description, and the same holds true for the component light fluxes IL incident on the entire projection area PD, which is a two-dimensional flat surface. That is, the projection area PD is irradiated with the planar image light in the form of the entire component light fluxes so that image projection is performed over the entire projection area PD to form a projected image. As for the number of self-luminous devices 10a to be involved in the component light flux superimposition, component light fluxes IL from two light emission points are superimposed on each other in a single position on the single projection area PD in FIG. 4(A), but the number described above is not limited to two. For example, component light fluxes IL from three or more light emission points may be superimposed on one another in a single position on the projection area PD. The degree of the superimposition is changed as appropriate in accordance, for example, with the relationship between the number of light emission points (number of self-luminous devices 10a) and required resolution.

A description will next be made of the image projection in the case shown in FIG. 4(B). It is assumed that three positions PB1 to PB3 representatively shown as projection receiving positions in the projection area PD in FIG. 4(B) correspond to the three positions PA1 to PA3 in FIG. 4(A). In other words, a situation in which the states of images in the positions PA1 to PA3 are equal to the states of images in the positions PB1 to PB3 means that a projected image in the projection area PD in FIG. 4(A) coincides with a projected image in the projection area PD in FIG. 4(B). In the projection shown in FIG. 4(B), the circuit apparatus 80 also controls the light exit adjustment mechanism 100 to form an image on the projection area PD, as in the case shown in FIG. 4(A) described above. In the case shown in FIG. 4(B), however, the information on the distance to the projection area PD, which is acquired from the imaging unit 70, differs from the distance information in the case shown in FIG. 4(A) (projection area PD in the case shown in FIG. 4(B) is closer than in the case shown in FIG. 4(A)). The circuit apparatus 80 therefore controls the light exit adjustment mechanism 100 in such a way that the relationship between the positions on the projection area PD and the self-luminous devices 10a corresponding thereto in the light exit adjustment mechanism 100 differs from the relationship in the case shown in FIG. 4(A). In the case shown in FIG. 4(B), for example, the circuit apparatus 80 controls the light exit adjustment mechanism 100 in such a way that among the projection positions of the projection area PD, the position PB1 located in a lower portion thereof receives a component light flux IL from a self-luminous device a2 (10a), which is the second counted from above in FIG. 4(B), (solid line in FIG. 4(B)) and a component light flux IL from a self-luminous device a7 (10a), which is the seventh counted from above in FIG. 4(B), (solid line in FIG. 4(B)). Similarly, the circuit apparatus 80 controls the light exit adjustment mechanism 100 in such a way that among the projection positions on the projection area PD, the position PB2 located in a central portion thereof receives component light fluxes IL from other self-luminous devices 10a (broken lines in FIG. 4(B)), and that among the projection positions of the projection area PD, the position PB3 located in an upper portion thereof receives component light fluxes IL from still other self-luminous devices 10a as indicated by the dashed lines (dashed lines in FIG. 4(B)).

As described above, in the projector 2 according to the present embodiment, even when the position of the projection area PD changes within the irradiation receiving area, as in the cases shown in FIGS. 4(A) and 4(B), the image light can be so controlled that component light fluxes IL that can cope with the change are selected in terms of the light exit position and the light exit angle, whereby the same focused image can be formed without use of the focus function of the projection optical system 40. From a different point of view, the position where the image light outputted from the projector 2 is focused can be changed in accordance with a change in the projection area PD independently of the focus function.

Figure 5A:
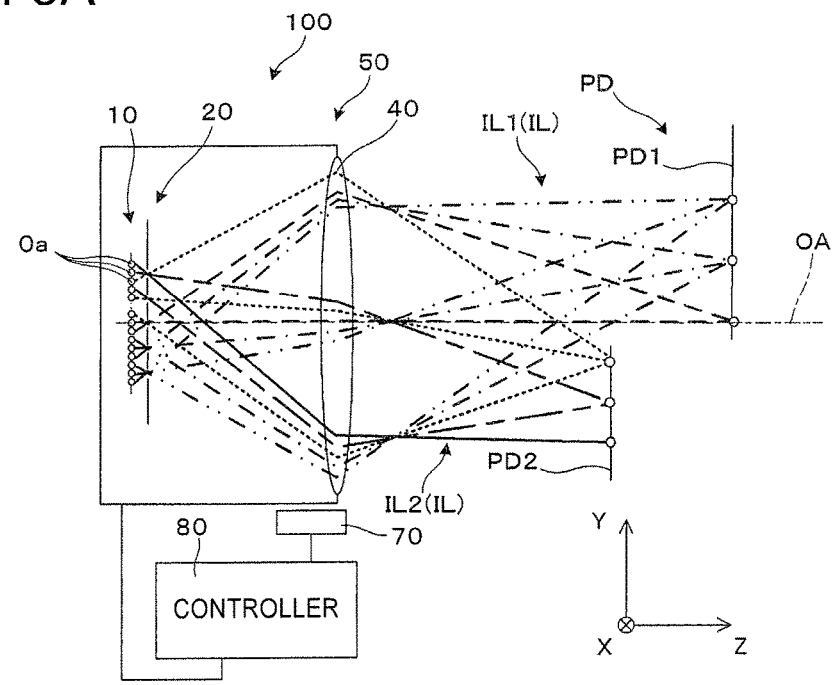
FIG. 5(A) is a view showing an example of image projection on two areas performed by the projector.
Figure 5B:
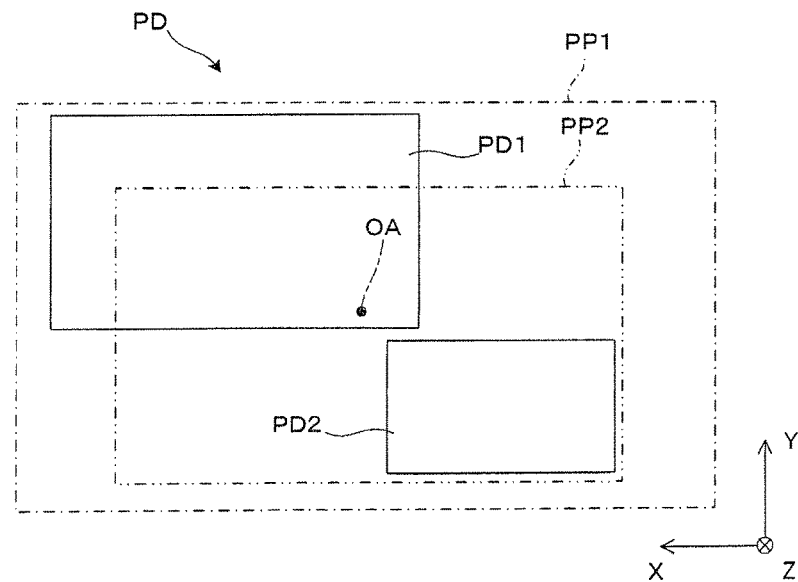
FIG. 5(B) is a front view conceptually showing the two areas in FIG. 5(A).

FIGS. 5(A) and 5(B) show an example of image projection on divided areas performed by the projector 2. Specifically, in the case shown in FIGS. 5(A) and 5(B), the projection area PD is divided into two areas (divided areas) containing positions different from each other in the depth direction, a first area PD1 and a second area PD2. In this example, the first area PD1 contains a remote position in the depth direction, and the second area PD2 contains a near position in the depth direction. It is assumed that each of the first area PD1 and the second area PD2 is a flat surface parallel to the XY plane perpendicular to optical axis OA. Even in the case of the divided areas described above, the projector 2 can form images both in the first area PD1 and the second area PD2 by controlling the operation of the light exit adjustment mechanism 100 in such a way that projection ranges over which the self-luminous devices 10a perform projection are separated into a projection range for the first area PD1 and a projection range for the first area PD2 based on information on the distances to the first area PD1 and the second area PD2 that is acquired from the imaging unit 70. In this case as well, the component light fluxes IL emitted together from the large number of self-luminous devices 10a, which are planarly arranged in the light emitter 10, form an image over the entire surface area of the projection area PD formed of the plurality of divided areas.

In FIG. 5(B), a projectable range in a plane including the first area PD1 in the projector 2 is called a projectable area PP1, and a projectable range in a plane including the second area PD2 in the projector 2 is called a projectable area PP2. That is, the projectable area PP1 is a virtual irradiation receiving area irradiated with image light, specifically, a range that can be irradiated with image light in a case where all the self-luminous devices 10a in the light emitter 10 emit light fluxes only toward a flat surface including the first area PD1. Similarly, the projectable area PP2 is a range that can be irradiated with image light in a case where all the self-luminous devices 10a in the light emitter 10 emit light fluxes only toward a flat surface including the second area PD2. In other words, to irradiate only the first area PD1 in the projectable area PP1, among the self-luminous devices 10a in the light emitter 10, only self-luminous devices 10a that emit component light fluxes IL having light exit positions and light exit angles that allow the component light fluxes IL to be collected in the first area PD1 may be selected and used. Similarly, to irradiate only the second area PD2 in the projectable area PP2, among the self-luminous devices 10a, the self-luminous devices 10a and the like may be selected such that only self-luminous devices 10a that emit component light fluxes IL having light exit positions and light exit angles that allow the component light fluxes IL to be collected in the second area PD2 can be used. That is, the circuit apparatus 80 only needs to control the light separation operation performed by the light exit adjustment mechanism 100 as appropriate.

As described above, in the present embodiment, the circuit apparatus 80 performs light flux separation control in which the component light fluxes IL having exited out of the light exit adjustment mechanism 100 are separated into component light fluxes IL that exit toward the first area PD1 and component light fluxes IL that exit toward the second area PD2, whereby the image formation described above is achieved. That is, the projector 2 is capable of simultaneous projection on a plurality of projection surfaces.

Figure 6:
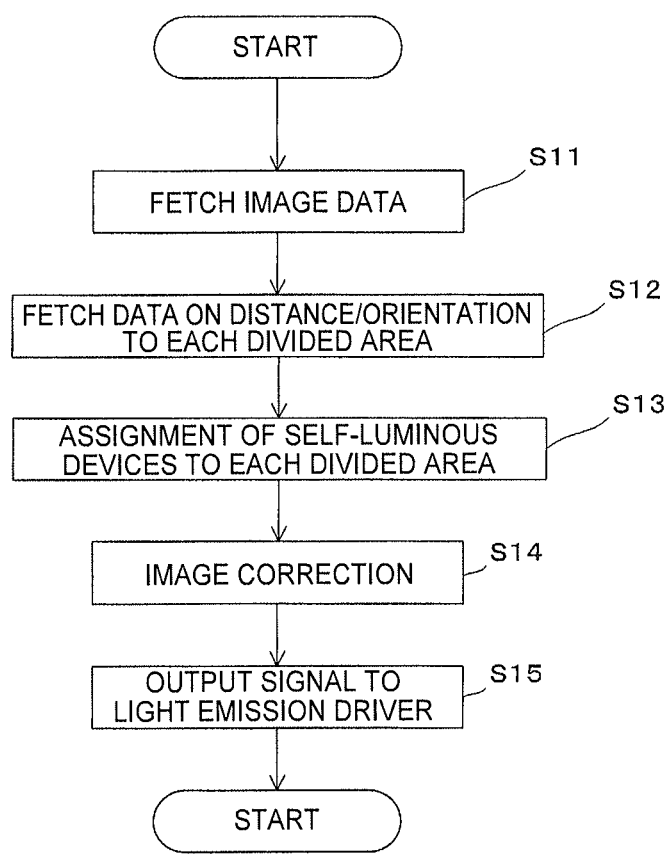
FIG. 6 is a flowchart for describing the operations of the image projection in FIGS. 5(A) and 5(B).

A description will next be made of an example of processes carried out in the image projection on the two divided areas shown in FIGS. 5(A) and 5(B) with reference to the flowchart in FIG. 6. The circuit apparatus 80 first externally fetches distance image data under the control of the main controller 88 (step S11).

The main controller 88 then activates the imaging unit 70 to cause it to capture an image of the projection area PD to acquire information on the distance thereto and fetches information on the position of the projection area PD, that is, the positions of the first area PD1 and the second area PD2 (step S12). More specifically, the main controller 88 activates a distance image generator 81a (see FIG. 2), which is built in the image processor 81, to cause it to extract data on the distances and orientations from the projector 2 to the first area PD1 and the second area PD2, which are divided areas of the projection area PD, based on the information acquired from the imaging unit 70.

The main controller 88 then extracts self-luminous devices 10a that emit component light fluxes IL that can be collected in the areas PD1 and PD2 based on the data on the distance and orientation acquired in step S12 and separates the component light fluxes IL into component light fluxes IL1 projected toward the first area PD1 and component light fluxes IL2 projected toward the second area PD2 (see FIG. 5(A)). The self-luminous devices 10a are thus assigned (step S13).

Based on the image data acquired in step S11 and the assignment of the self-luminous devices 10a in step S13, the main controller 88 then corrects the image data (step S14). That is, the image data is related to the self-luminous devices 10a that emit component light fluxes that form a projected image corresponding to the image data.

The main controller 88 finally sends an image signal based on the relationship obtained in step S14 to the light emission driver 82 (step S15), and image projection is initiated based on a drive signal from the light emission driver 82.

In the above description, simultaneous image projection is performed on the first area PD1 and the second area PD2.

Instead, for example, the projection on the first area PD1 and the projection on the second area PD2 can be performed in a time division manner. For example, in a case of control in which some of the plurality of self-luminous devices 10a are used both in the projection on the first area PD1 and the projection on the second area PD2, the time-division projection can be achieved by switching the projection on the first area PD1 to the projection on the second area PD2 and vice versa in a time division manner.

The above example has been described with reference to the case where the projection area PD is divided into two areas, and the image projection can be performed in the same manner also in a case where the projection area PD is divided into three or more areas. Further, each of the divided areas is on a flat surface in the above description, and an image can also be formed on a non-flat, curved surface.

Figure 7:
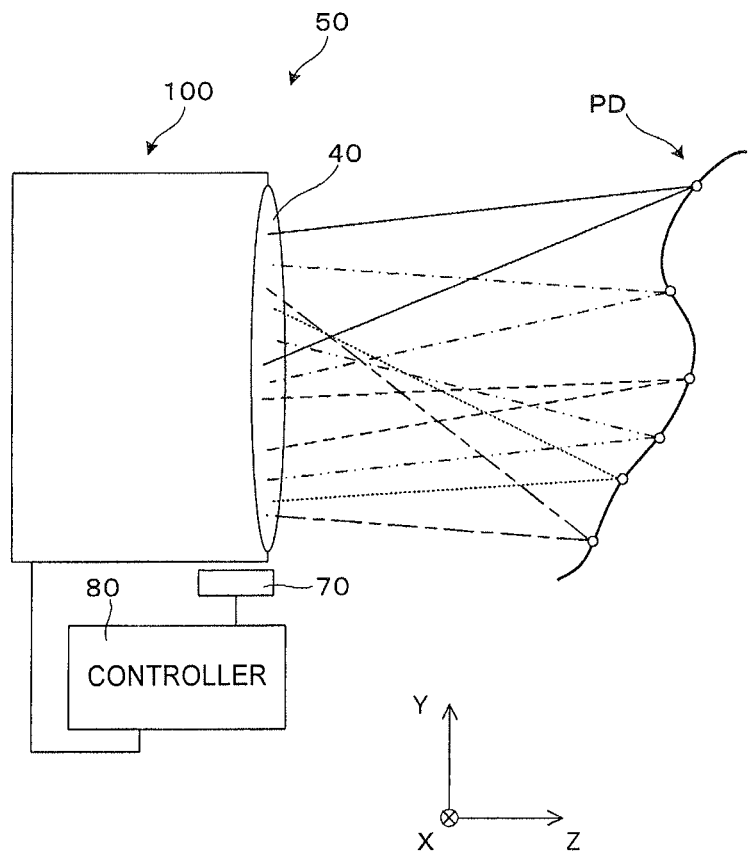
FIG. 7 is a view showing an example of projection on a non-flat surface performed by the projector.

Further, considering that a large number of minute curved surfaces are connected to each other to form a projection area PD that spreads two-dimensionally or three-dimensionally, the minute curved surfaces can be irradiated together with light fluxes from the corresponding self-luminous devices 10a. In this case, image projection can be performed on a projection area PD having a stereoscopic curved surface, for example, as shown in FIG. 7.

Figure 8A:
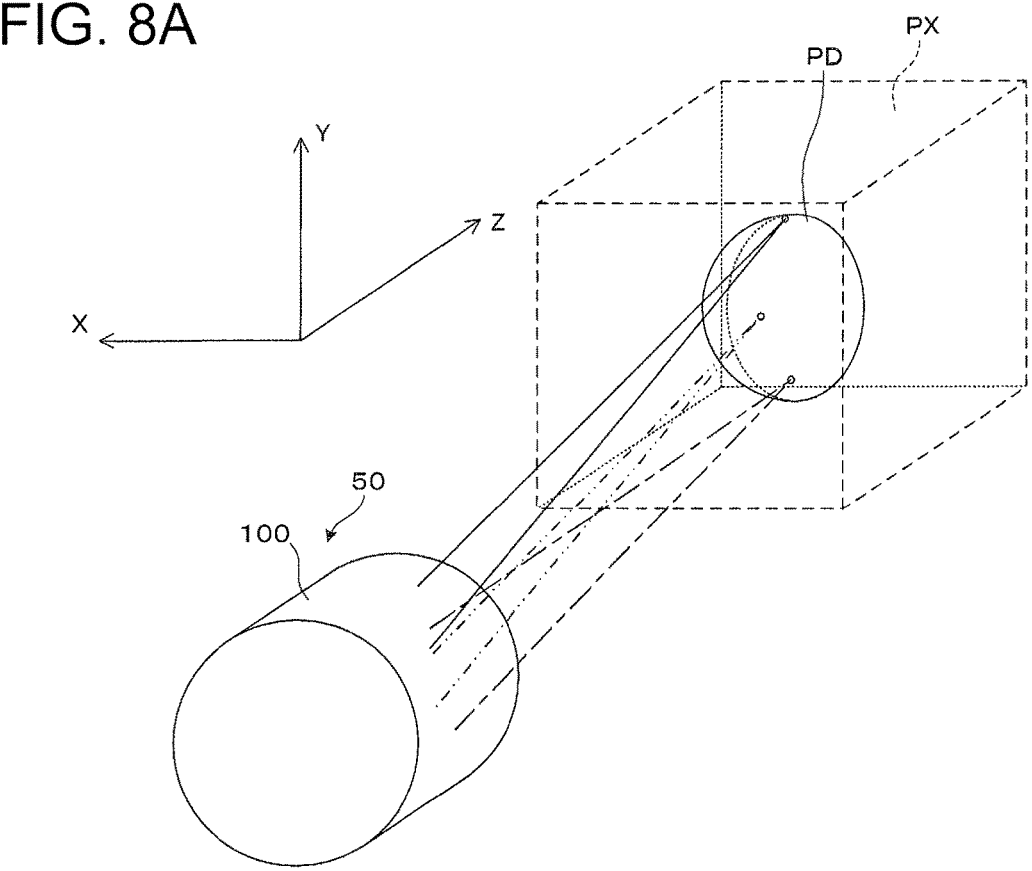
FIG. 8(A) is a perspective view showing an example of projection on a stereoscopic area performed by the projector.
Figure 8B:
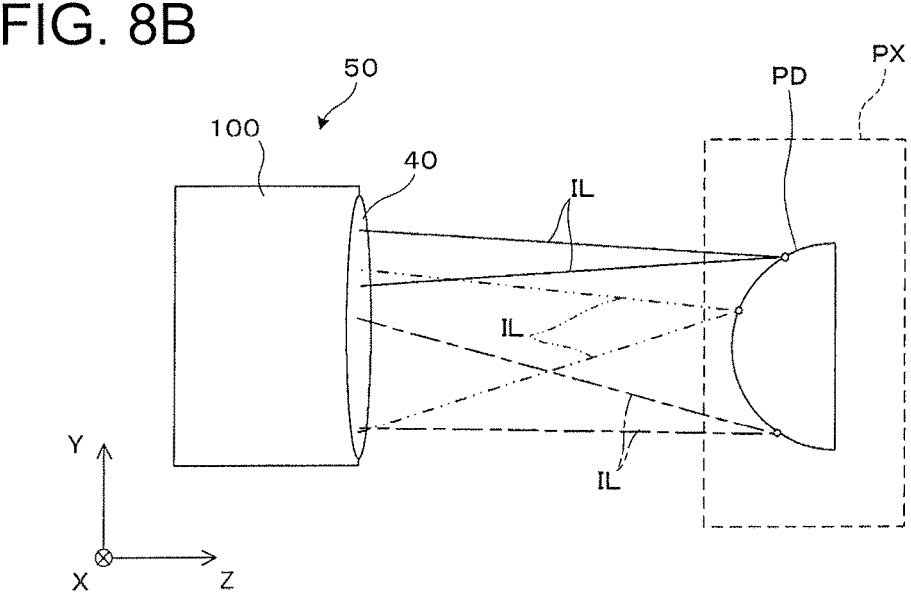
FIG. 8(B) is a side view of the projection in FIG. 8(A).

In addition, from a different point of view, it can be considered that the projector 2 is capable of projection in arbitrarily determined positions in a space. FIGS. 8(A) and 8(3) show an example of the state of projection on a stereoscopic area. That is, let a projectable area PX be a spatial (stereoscopic) area (irradiation receiving area) in which the projector 2 can project image light from the light exit adjustment mechanism 100, and the projection area PD can be freely set in the projectable area PX. FIGS. 8(A) and 8(B) show a case where the projection area PD has a semispherical shape by way of example.

As described above, the projector 2 according to the present embodiment includes the light exit adjustment mechanism 100, which adjusts (sets) the light exit angle to be used for each of the component light fluxes IL emitted from the self-luminous devices 10a, which are arranged in a plurality of positions in the light emitter 10, and the circuit apparatus 80, which is a light controller that controls the light exit position and the light exit angle of each of the component light fluxes IL that exit out of the light exit adjustment mechanism 100 in accordance with the projection area PD irradiated with the component light fluxes IL having passed through the light exit adjustment mechanism 100. Therefore, even when the irradiation receiving area, that is, the projection area has a depth, that is, has areas at different distances in the depth direction, the light exit adjustment mechanism 100, which causes the component light fluxes that form image light to exit from a plurality of positions at angles different from each other under the control of the circuit apparatus 80, allows simultaneous or concurrent projection on the projection areas. In other words, simultaneous or concurrent projection can be performed in spaces at different positions in the depth direction.

Further, in the projector 2 described above, which can form video images in arbitrary positions, a plurality of projectors required to perform projection on a stereoscopic object, for example, in projection mapping, in related art can be replaced with the single projector 2. Moreover, the projector 2 described above, which can change the light ray collection density on a position basis, can be used, for example, in an application in which only a portion of video images is made particularly bright. For example, the ability to make only part of video images shine allows metallic luster and other types of expressions. Further, no focal point adjustment mechanism is required, resulting in cost reduction and improvement in in-focus impression in projection mapping, for example, on a stereoscopic object.

[Second Embodiment]

A projector according to a second embodiment will be described below. The projector according to the second embodiment is a variation of the projector according to the first embodiment, and portions that will not be particularly described have the same structures as those in the projector according to the first embodiment.

Figure 9:
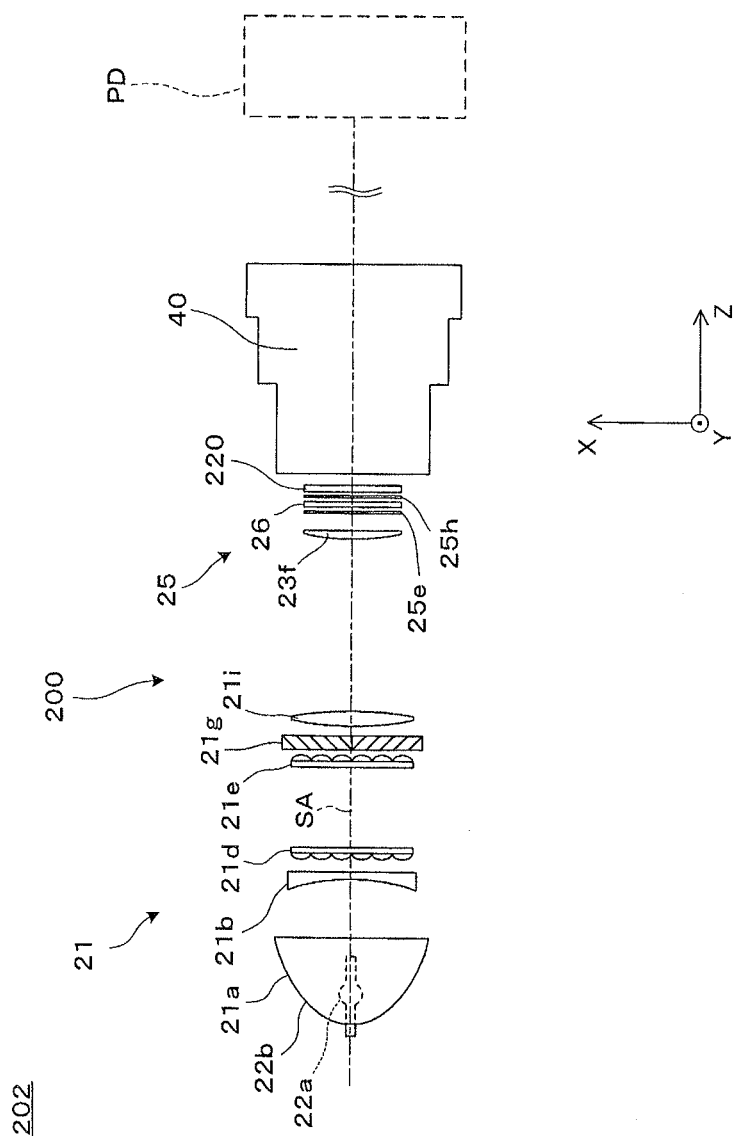
FIG. 9 is a view for describing a projector according to a second embodiment.

A projector 202 according to the second embodiment is a single-plate projector and includes alight exit adjustment mechanism 200 formed of the following sections: alight source apparatus 21, which includes a light source section that produces light source light and an illumination optical system that forms illumination light from the light source light from the light source section; a light modulator 25, which is illuminated with the illumination light outputted from the light source apparatus 21; and a light selector 220, which selects component light fluxes from those that form color image light fluxes outputted from the light modulator 25, as shown in FIG. 9. The projector 202 further includes a projection optical system 40, which projects the image light fluxes formed of the component light fluxes selected by the light selector 220 on a projection area PD.

In the thus configured projector 202, the light source apparatus 21 includes a light source lamp 21a, a concave lens 21b, a pair of lens arrays 21d and 21e, a polarization conversion member 21g, and a superimposing lens 21i. Among them, the light source lamp 21a, which is the light source section that produces light source light, includes a lamp body 22a, which is, for example, a high-pressure mercury lamp, and a concave mirror 22b, which collects the light source light and directs it forward. The concave lens 21b has a role of parallelizing the light source light from the light source lamp 21a but can be omitted, for example, in a case where the concave mirror 22b is a parabolic surface mirror. Each of the pair of lens arrays 21d and 21e, which form the illumination optical system, is formed of a plurality of element lenses arranged in a matrix, and the element lenses divide the light source light having originated from the light source lamp 21a and passed through the concave lens 21b into light fluxes, and cause the light fluxes to converge and diverge on a light flux basis. The polarization conversion member 21g, although it will not be described in detail, includes a prism array having PBSs and mirrors incorporated therein, and a wave plate array attached in the form of stripes onto the light exiting surface of the prism array. The superimposing lens 21i causes the entire illumination light fluxes having exited out of the polarization conversion member 21g to converge as appropriate to achieve superimposed illumination on a liquid crystal light valve provided as the light modulator 25. That is, the illumination light fluxes having exited out of the lens arrays 21d and 21e and having passed through the superimposing lens 21i are superimposed on one another and uniformly illuminate a liquid crystal panel 26 provided in the light modulator 25.

The light modulator 25 is formed of a liquid crystal light valve, as described above. More specifically, the light modulator 25 is a non-luminous-type light modulator that includes the liquid crystal panel 26, which is a liquid crystal device, a light-incident-side polarizer 25e, and a light-exiting-side polarizer 25h and modulates the spatial distribution of the intensity of the incident illumination light on a constituent pixel basis. A field lens 23f, which adjusts the incident illumination light, is provided in a position upstream of the light modulator 25.

The light selector 220 is disposed in a position downstream of the liquid crystal light valve that forms the light modulator 25 described above. The light selector 220 is a panel-type member that switches light blockage to light transmission and vice versa and is formed, for example, of a liquid crystal panel. That is, the light selector 220 is formed of a switching panel for selecting an exit angle of the light outputted from the light modulator 25 on a pixel basis.

That is, in the present embodiment, the liquid crystal light valve that forms the light modulator 25 and the light selector 220 form what is called a double light valves, which can adjust the light exit position and the light exit angle of each of the component light fluxes. That is, the light modulator 25 serves as a first light valve that determines the positions of light emission points as a light emitter that emits planar light, and the light selector 220 serves as a second light valve that determines the light exit angles of the light fluxes produced by the first light valve. The first and second light valves are responsible for an essential function of the light exit adjustment mechanism 200.

Figure 10A:
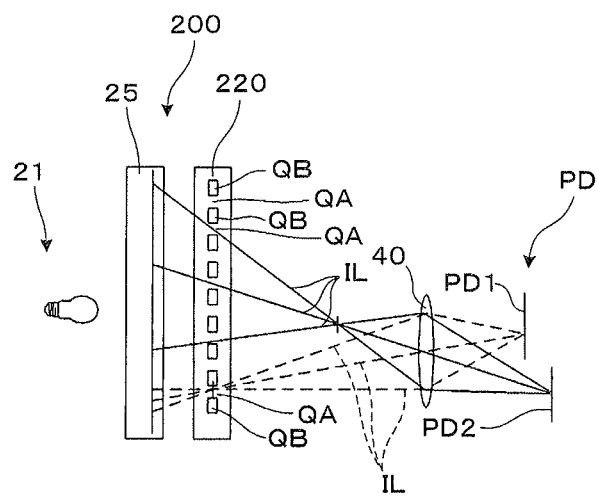
FIG. 10(A) is a view for conceptually showing part of the structure of the projector.

Image projection performed by the projector 202 according to the present embodiment will be specifically described with reference to FIG. 10(A). FIG. 10(A) conceptually shows part of the structure shown in FIG. 9, that is, the structures of the light exit adjustment mechanism 200 and components therearound. As shown in FIG. 10(A), in the light modulator 25, modulation is performed from the illumination light on a pixel basis, and component light fluxes IL are outputted from the positions of pixels that form the liquid crystal panel 26 (first light valve) in the light modulator 25 under the control of a circuit apparatus (not shown). That is, a plurality of pixels that form the liquid crystal panel 26, which is the first light valve, are what is called a plurality of planarly arranged light emission points. Each of the component light fluxes IL outputted from the light modulator 25 is incident on the light selector 220 (second light valve), where the light exit angle of the component light flux IL is adjusted. That is, among the component light fluxes IL that exit from the pixels that form the liquid crystal panel 26 in the light modulator 25 and diverge to some extent, only component light fluxes IL that exit at desired angles are selected, pass through the projection optical system 40, and are projected on the projection area PD. In the example shown in FIG. 10(A), the projection area PD is formed of two divided areas PD1 and PD2. Part of the component light fluxes IL are projected toward the divided area PD1, and the other component light fluxes IL are projected toward the second divided area PD2. That is, the component light fluxes IL are separated based on the light exit positions determined by the light modulator 25 and the light exit angles determined by the light selector 220.

Also in the present embodiment, even when the irradiation receiving area, that is, the projection area has a depth, that is, has areas at different distances in the depth direction, the light exit adjustment mechanism 200, which causes the component light fluxes that form image light to exit from a plurality of positions at angles different from each other, allows simultaneous or concurrent projection on the projection areas.

Figure 10B:
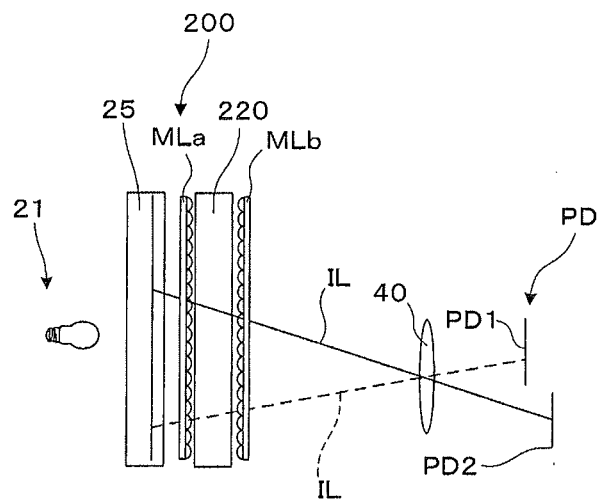
FIG. 10(B) is a view for describing the structure of a projector according to a variation.

Further, a pair of microlens arrays MLa and MLb may be disposed in positions upstream and downstream of the switching panel that forms the light selector 220 to capture a greater amount of light, as in a variation shown in FIG. 10(B).

Figure 11A:
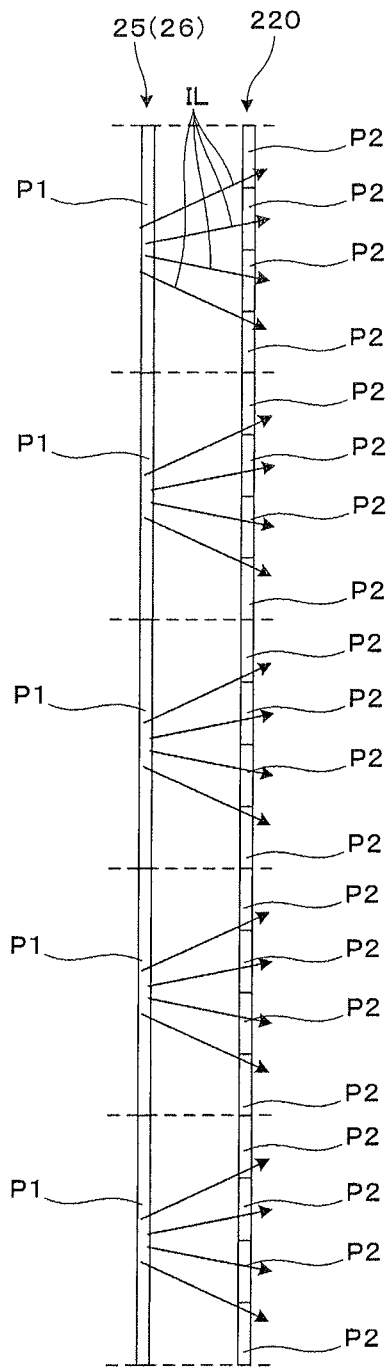
FIG. 11(A) is a view for describing light exit angle adjustment in a projector according to a variation.

FIG. 11(A) is an enlarged view showing an example of part of the double light valve structure in the present embodiment. The number of pixels that form the light valve in the light modulator 25 (first light valve) described above and the number of pixels that form the light valve in the light selector 220 (second light valve) can be equal to each other or configured in a 1:1 relationship, but the number of pixels in the second light valve can instead be greater than the number of pixels in the first light valve (finer pixels in second light valve), as shown in FIG. 11(A). That is, a configuration in which one pixel P1 in the light modulator 25 corresponds to a plurality of pixels P2 in the light selector 220 (4×4=16 in FIG. 11(A)) may be employed. As a result, among angularly divergent image light components that exit from the pixels in the light modulator 25, image light components that exit at necessary light angles can be selected.

Figure 11B:
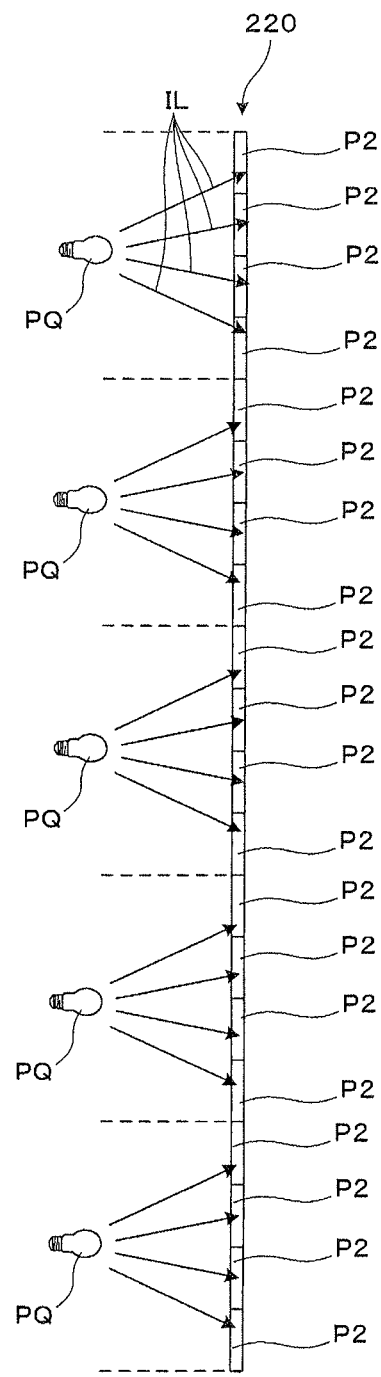
FIG. 11(B) is an view showing a projector according to another variation.

The configuration described above is also applicable to a configuration different from the configuration described above in which the pixels of the first light valve serve as light emission points. For example, even in case where the light emitter is formed of light source devices PQ, each of which is a self-luminous light source and produces divergent light, a light valve in which a plurality of pixels P2 correspond to each of the light source devices PQ can be used as the light selector 220 to restrict the light exit angles of the light fluxes emitted from the light source devices PQ, as shown in FIG. 11(B).

[Third Embodiment]

A projector according to a third embodiment will be described below. The projector according to the second embodiment is a variation of the projector according to the second embodiment, and portions that will not be particularly described have the same structures as those in the projector according to the second embodiment.

Figure 12:
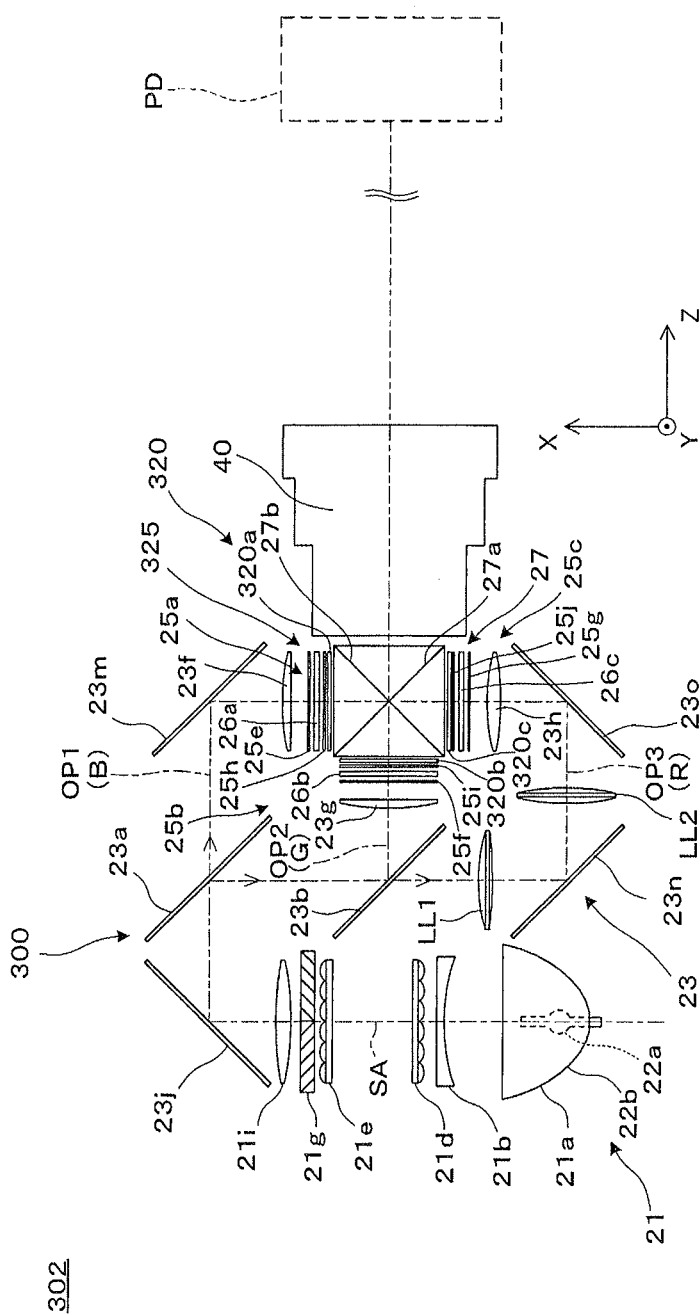
FIG. 12 is a view for describing a projector according to a third embodiment.

A projector 302 according to the third embodiment includes the following components as the light emitter in a light exit adjustment mechanism 300: the light source apparatus 21; a color separation optical system 23, which separates the light source light from the light source apparatus 21 into three color light fluxes or red, green, and blue light fluxes; and a light modulator 325, which is illuminated with color illumination light fluxes having exited out of the color separation optical system 23, and the projector 302 further includes a light selector 320, which is another constituent element of the light exit adjustment mechanism 300 besides the light emitter and selects components light fluxes from those that form color image light fluxes having exited out of the light modulator 325, as shown in FIG. 12. The projector 302 further includes a cross dichroic prism 27, which is a light combining prism (light combining optical system) that combines the color image light fluxes formed of the component light fluxes selected by the light selector 320, and the projection optical system 40, which projects image light having exited out of the cross dichroic prism 27 on a projection area PD.

In the thus configured projector 302, the light source apparatus 21 includes the light source lamp 21a, the concave lens 21b, the pair of lens arrays 21d and 21e, the polarization conversion member 21g, and the superimposing lens 21i, and the light source lamp 21a includes the lamp body 22a and the concave mirror 22b, as in the projector 202 according to the second embodiment (see FIG. 9). The superimposing lens 21i causes the entire illumination light fluxes having exited out of the polarization conversion member 21g to converge as appropriate to achieve superimposed illumination on liquid crystal light valves 25a, 25b, and 25c for the respective colors provided in the light modulator 325. That is, the illumination light fluxes having exited out of the lens arrays 21d and 21e and having passed through the superimposing lens 21i pass through the color separation optical system 23, which will be described below in detail, are superimposed on one another, and uniformly illuminate liquid crystal panels 26a, 26b, and 26c provided in the light modulator 325.

The color separation optical system 23 includes first and second dichroic mirrors 23a and 23b, field lenses 23f, 23g, and 23h, and reflection mirrors 23j, 23m, 23n, and 23o and forms, along with the light source apparatus 21, an illuminator. Here, among the three color light fluxes or the blue, green, and red light fluxes, the first dichroic mirror 23a transmits, for example, the blue (B) light flux and reflects the green (G) light flux and the red (R) light flux. Further, the second dichroic mirror 23b reflects one of the two color light fluxes or the green and red light fluxes incident thereon, for example, the green (G) light flux and transmits the red (R) light flux. The B, G, and R light fluxes, which form the light source light, are thus guided to first, second, and third optical paths OP1, OP2, OP3, respectively, and incident on different illumination receiving components.

The light modulator 325 includes the three liquid crystal light valves 25a, 25b, and 25c in correspondence with the three optical paths OP1, OP2, and OP3 for the respective colors described above.

The liquid crystal light valve 25a for B light disposed in the first optical path OP1 includes the liquid crystal panel 26a, which is illuminated with the B light, a light-incident-side polarizer 25e, which is disposed on the light incident side of the liquid crystal panel 26a, and a light-exiting-side polarizer 25h, which is disposed on the light exiting side of the liquid crystal panel 26a.

The liquid crystal light valve 25b for G light disposed in the second optical path OP2 includes the liquid crystal panel 26b, which is illuminated with the G light, a light-incident-side polarizer 25f, which is disposed on the light incident side of the liquid crystal panel 26b, and a light-exiting-side polarizer 25i, which is disposed on the light exiting side of the liquid crystal panel 26b.

The liquid crystal light valve 25c for R light disposed in the third optical path OP3 includes the liquid crystal panel 26c, which is illuminated with the R light, a light-incident-side polarizer 25g, which is disposed on the light incident side of the liquid crystal panel 26c, and a light-exiting-side polarizer 25j, which is disposed on the light exiting side of the liquid crystal panel 26c.

The light selector 320 includes three switching panels 320a, 320b, and 320c, which are disposed in positions downstream of the three liquid crystal light valves 25a, 25b, and 25c, which form the light modulator 325 described above.

The switching panel 320a, which is disposed in a position downstream of the liquid crystal light valve 25a, selects an light exit angle of the B light having exited out of the liquid crystal light valve 25a on a pixel basis. The switching panel 320b, which is disposed in a position downstream of the liquid crystal light valve 25b, selects an exit angle of the G light having exited out of the liquid crystal light valve 25b on a pixel basis. The switching panel 320c, which is disposed in a position downstream of the liquid crystal light valve 25c, selects an exit angle of the R light having exited out of the liquid crystal light valve 25c on a pixel basis. That is, the switching panels 320a to 320c make angular component adjustment.

The cross dichroic prism 27 corresponds to a light combining optical system and has a pair of dichroic mirrors 27a and 27b formed therein, which intersect each other in an X-like shape. One of the dichroic mirrors, the first dichroic mirror 27a reflects the B light, and the other dichroic mirror or the second dichroic mirror 27b reflects the R light. The thus configured cross dichroic prism 27 outputs color image light that is a combination of the B light, the G light, and the R light.

The projection optical system 40 projects, as a projection optical system, the combined color image light from the cross dichroic prism 27 on the projection area PD at a desired magnification. That is, color motion images or color still images having a desired magnification and corresponding to drive signals or image signals inputted to the liquid crystal panels 26a to 26c are projected.

Also in the present embodiment, even when the irradiation receiving area, that is, the projection area has a depth, that is, has areas at different distances in the depth direction, the light exit adjustment mechanism 300, which causes the component light fluxes that form image light to exit from a plurality of positions at angles different from each other, allows simultaneous or concurrent projection on the projection areas.

The invention is not limited to the embodiments described above or examples thereof and can be implemented in a variety of aspects to the extent that they do not depart from the substance of the invention.

Figure 13:
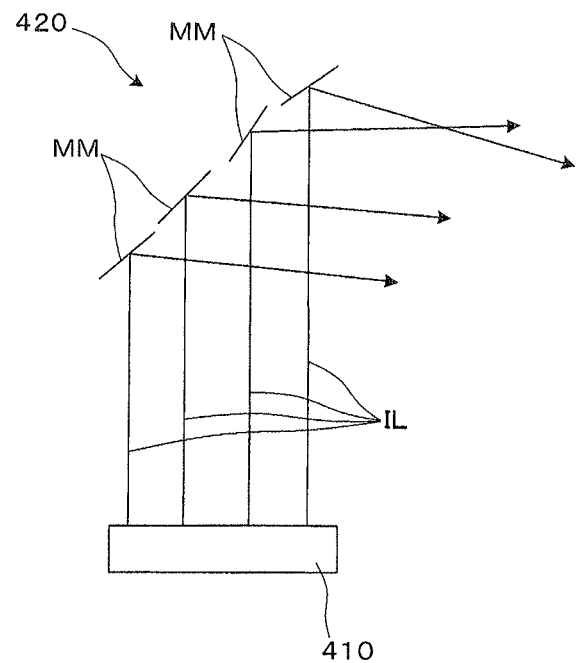
FIG. 13 describes a projector according to another variation.

For example, the light exit adjustment mechanism is not limited to those described above and may, for example, have a configuration in which a light emitter 410, which is formed, for example, of a surface-emitting laser, and a light selector 420, which is formed of a digital micromirror device in which a large number of micromirrors MM are arranged are used to project component light fluxes IL planarly emitted from the light emitter 410 in parallel to each other at predetermined light exit angles set by the light selector 420, which is the digital micromirror device, as shown in FIG. 13. In this case, for example, the timing at which the surface-emitting laser emits light fluxes is synchronized with the speed at which the digital micromirror device is rotated. Further, the digital micromirror device may instead be operated to provide only ON and OFF states switched from one to the other as the light selector.

Further, the above description has been made of the light irradiation on the basis of light source points of each of the light emitters or the pixels of each of the panels. Instead, a plurality of sub-surface light sources can be combined with each other to form a planar light emitter. That is, to form a light emitter, for example, a plurality of small block-shaped light source sections that produce planar light from a plurality (large number) of positions to form image light can be combined with each other to form a single light emitter. In this case, for example, each of the small block-shaped light source sections may irradiate part of a projection area PD, and all the small block-shaped light source sections combined with each other may irradiate the entire projection area PD. Further, component light fluxes emitted from different small block-shaped light source sections may be superimposed on one another, with which part or entire of the projection area PD may be irradiated. Moreover, each of the small block-shaped light source sections may be so controlled that image correction is performed therein in accordance with a distance image from the imaging unit 70.

Further, each of the laser-type light emitting devices shown in FIG. 3(A), for example, may be provided with a variable mirror that adjusts the light exit angle.

In addition, the number of light emission points in the light emitter, that is, the number of self-luminous devices and the number of pixels that form the first light valve can be set in a variety of manners, and the greater the number of light emission points, the greater the flexibility in the light exit angle selection described above. From a different point of view, the greater the number of pixels on the light source side or the image formation side, the greater the degree of improvement in acceptance of depth information on the irradiation receiving area, whereby a projection area PD having a complicated stereoscopic shape is readily handled. Further, the increase in the number of pixels allows an increase in the number of component light fluxes IL to be superimposed on one another, that is, allows formation of a brighter image.

In addition, the light emitter, for example, has the configuration in which the self-luminous devices are arranged in a flat plane and can also have a configuration in which the self-luminous devices are arranged in a curved plane. Further, the arrangement of the self-luminous devices may be changed in accordance with the shape of a projection area to adjust the light exit position and the light exit angle of each of the component light fluxes.

Moreover, the panel used in the light selector is not limited to a transmissive liquid crystal panel and can instead be a reflective liquid crystal panel.

Further, in the light emitter, a pixel shift (e-shift) function may be provided to increase a pseudo number of pixels.

In addition, the projection optical system 40 may be a zoom lens. In this case, reduction projection can be performed, and a variable depth of field can be achieved. Adjusting the depth of field of the projection optical system 40 allows the display range in the depth direction to be widened. Further, a variable focused state of the projection optical system 40 allows the three-dimensional projection space provided by the projector 2 to be shifted along the optical axis OA.

Reference Signs List

2: projector
10: light emitter
10a, a2, a4, a5, a7: self-luminous device
20, 220, 320: light selector
21: light source apparatus (light source section, illumination optical system)
23: color separation optical system
25: light modulator
25a, 25b, 25c: liquid crystal light valve
26, 26a, 26b, 26c: liquid crystal panel
27: cross dichroic prism
27a, 27b: dichroic mirror
40: projection optical system
50: optical system unit
70: imaging unit
80: circuit apparatus (light controller)
81: image processor
81a: distance image generator
82: light emission driver
88: main controller
100, 200, 300: light exit adjustment mechanism
202: projector
302: projector
320a, 320b, 320c: switching panel
CP: cap member (lens portion)
IL: component light flux
ILa: component light flux
ILb: component light flux
LD: laser-type light emitting device
LE: light emitting device
LL1, LL2: lens
MLa, MLb: microlens array
OA: optical axis
OP1, OP2, OP3: optical path
PA1 to PA3: position
PB1 to OB3: position
PD: projection area
PD1: PD2: divided area
PP1: projectable area
PP2: projectable area
PQ: light source device
PX: projectable area
QA: light transmitter
QB: light blocker
SA: light exiting surface

The invention claimed is:

1. A projector for projecting a display image onto a projection area, comprising:
   a light exit adjustment mechanism capable of adjusting a light exit angle to be used for each of component light fluxes that exit from a plurality of positions in a light emitter;
   an imager configured to capture an image of the projection area and determine distances from the projector to various portions of the projection area: and
   a light controller that controls a light exit position and the light exit angle of each of the component light fluxes that exit out of the light exit adjustment mechanism in accordance with the determined distances from the projector to the various portions of the projection area that is located in an irradiation receiving area irradiated with the component light fluxes having passed through the light exit adjustment mechanism and contains different positions in a depth direction.

2. The projector according to claim 1,
further comprising a projection optical system that projects the component light fluxes having passed through the light exit adjustment mechanism on the projection area.

3. The projector according to claim 1,
wherein the light exit adjustment mechanism includes a light selector that limits light transmission for each of the component light fluxes emitted from the light emitter to select a component having the light exit angle to be used.

4. The projector according to claim 3,
wherein the light selector is a panel-type member that switches light blockage to light transmission and vice versa, and
the light controller controls the switching performed by the panel-type member between the light blockage and the light transmission to cause the panel-type member that receives the component light fluxes emitted from the light emitter to select a component having a predetermined light exit angle.

5. The projector according to claim 1,
wherein in the light exit adjustment mechanism, the light emitter includes a planar light emission source, and the two-dimensional or three-dimensional projection area is irradiated together with the component light fluxes emitted from the light emission source.

6. The projector according to claim 1,
wherein the light emitter includes a plurality of self-luminous devices that emit the component light fluxes from a plurality of planarly arranged light emission points.

7. The projector according to claim 6,
wherein each of the self-luminous devices produces coherent light.

8. The projector according to claim 6,
wherein the light exit adjustment mechanism includes a plurality of lens portions that are provided in correspondence with the plurality of light emission points in the light emitter and each adjust the light exit angle of the light flux emitted from the corresponding light emission point.

9. The projector according to claim 1,
wherein the light emitter includes an illumination optical system that forms illumination light from light source light produced by a light source section and a light modulator that modulates the illumination light from the illumination optical system.

10. The projector according to claim 9,
wherein the light exit adjustment mechanism includes a panel-type member that switches light blockage to light transmission and vice versa as the light selector that receives the component light fluxes emitted from the light emitter and selects a component having a light exit angle, and the panel-type member is so configured that a plurality of pixels thereof correspond to each of pixels that form the light modulator.

11. The projector according to claim 1,
wherein the light exit adjustment mechanism causes the light emitter to form color component light fluxes in correspondence with color light fluxes and adjusts an angular component to be used for each of the color component light fluxes, and
the projector further comprises a light combining optical system that combines the color component light fluxes having passed through the light exit adjustment mechanism.

* * * * *